United States Patent [19]
Taylor

[11] Patent Number: 5,931,909
[45] Date of Patent: Aug. 3, 1999

[54] SYSTEM FOR MULTIPLE-CLIENT SOFTWARE INSTALLATION AND UPGRADE

[75] Inventor: Julian S. Taylor, Colorado Springs, Colo.

[73] Assignee: Sun Microsystems, Inc., Palo Alto, Calif.

[21] Appl. No.: 08/635,385

[22] Filed: Apr. 19, 1996

[51] Int. Cl.$^6$ ............................. G06F 13/38; G06F 15/17
[52] U.S. Cl. .......................... 709/221; 395/712; 395/653
[58] Field of Search ............................... 395/712, 200.51, 395/200.5, 200.52, 651, 652, 653

[56] References Cited

U.S. PATENT DOCUMENTS

| | | | |
|---|---|---|---|
| 4,888,683 | 12/1989 | Koizumi et al. | 395/712 |
| 4,954,941 | 9/1990 | Redman | 395/712 |
| 5,008,814 | 4/1991 | Mathur | 395/200.51 |
| 5,155,847 | 10/1992 | Kirouac et al. | 395/600 |
| 5,247,683 | 9/1993 | Holmes et al. | 395/200.51 |
| 5,291,591 | 3/1994 | Kawano et al. | 395/712 |
| 5,421,009 | 5/1995 | Platt | 395/200.51 |

*Primary Examiner*—Mark H. Rinehart
*Attorney, Agent, or Firm*—William J. Kubida; Robert H. Kelly; Holland & Hart LLP

[57] ABSTRACT

A software package is installed to multiple target systems in a client/server distributed processing system. The software package is installed on program files of the server. A target list of clients served by the server is established, and the software package is installed on program files of each client in the target list. In one embodiment, the software package contains installation options for each client in the target list, and the target list establishing operation analyzes each client to determine what, if any, installation options are to be installed on the client and constructs a target list of clients and installation options for each client as determined by the analysis. In another embodiment, the software package contains additional software packages for each client on the target list and the target list establishing operation analyzes each client to determine if one or more client-specific packages are to be installed on the client and what are the to-be-installed, client-specific packages. The installing operation in this embodiment reads from the target list a client entry, identifying a client and client-specific packages for the client, and installs onto the file system of the client the client-specific packages identified in the client entry.

15 Claims, 4 Drawing Sheets

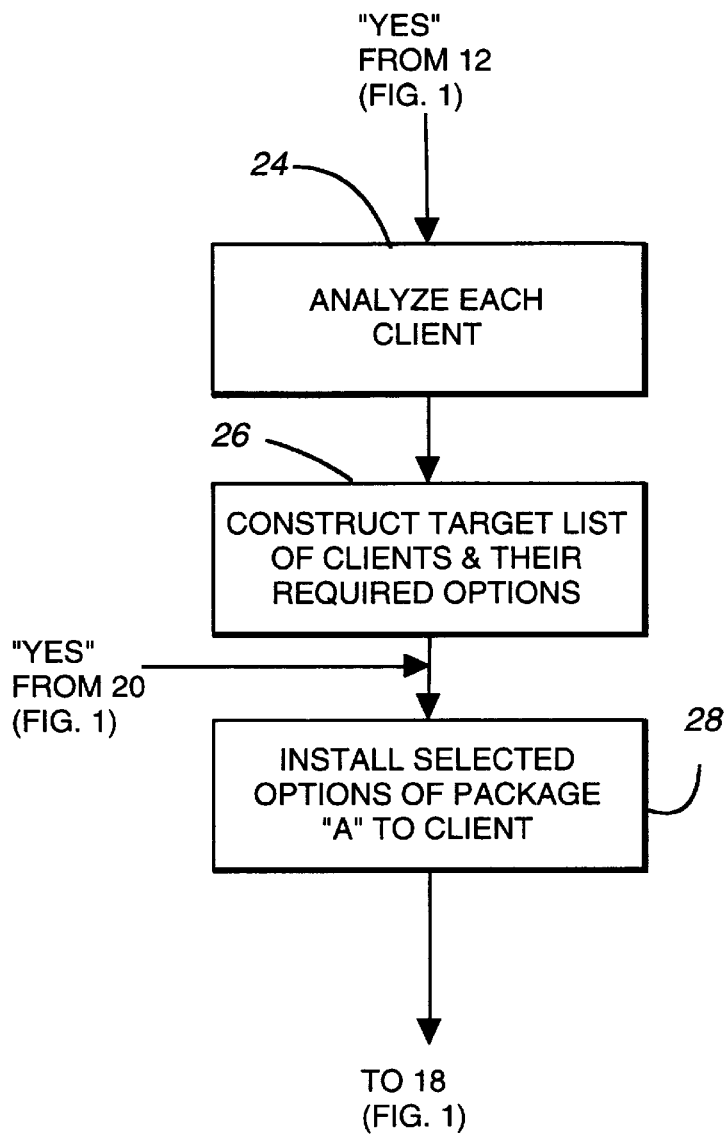

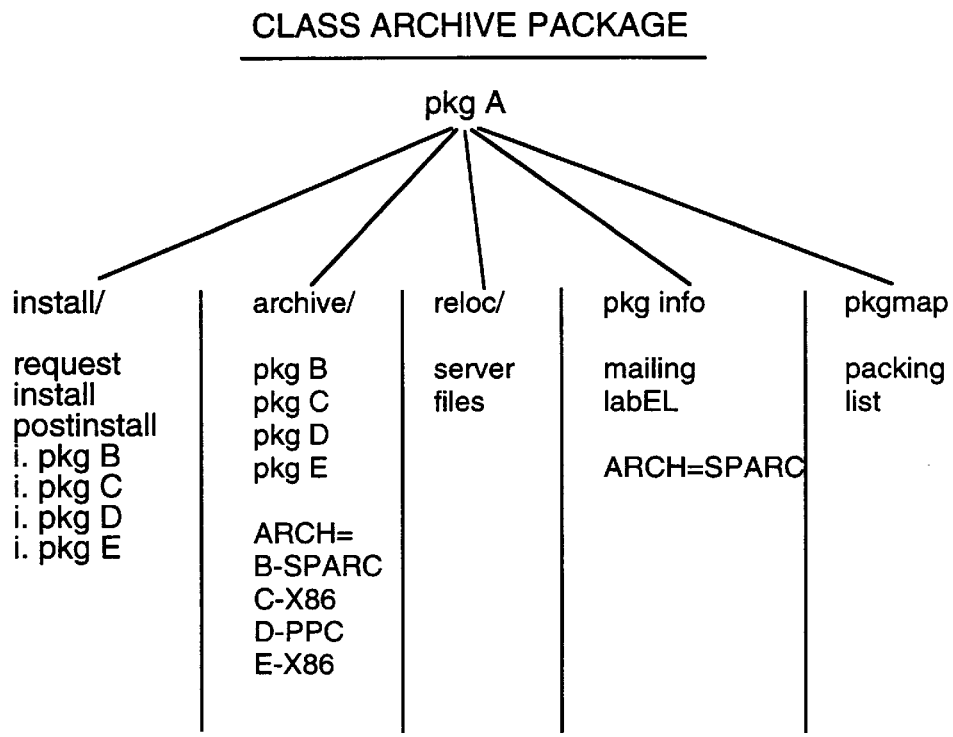
Fig. 5
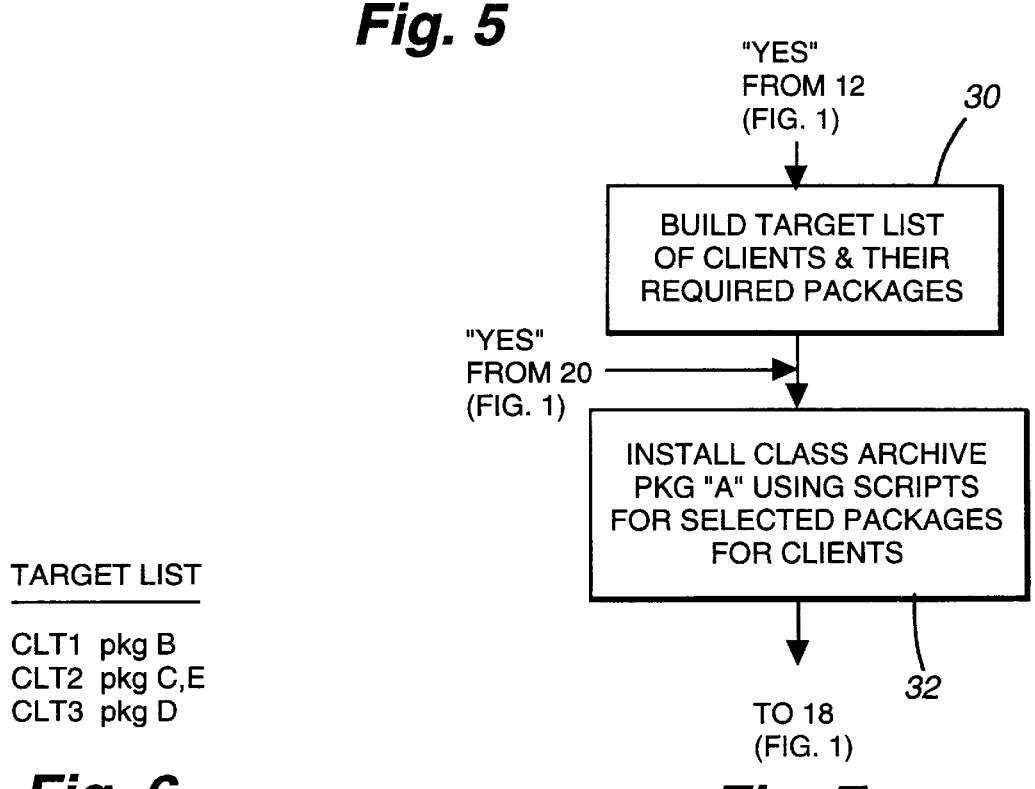
TARGET LIST
CLT1 pkg B
CLT2 pkg C,E
CLT3 pkg D
Fig. 6
Fig. 7

SYSTEM FOR MULTIPLE-CLIENT SOFTWARE INSTALLATION AND UPGRADE

BACKGROUND OF THE INVENTION

1. Field of the Invention

This invention relates to installing software products, herein referred to as software packages or packages, onto computing systems in a distributed processing computing system having a server and multiple clients. More particularly, the invention relates to installing a software package onto server file space and multiple client file spaces in a file system of the server.

2. Description of Related Art

In a distributive processing system, multiple client computer workstations, i.e. clients, attached to a server computing system, i.e. server, are provided with computer services, particularly file system services, from the server. In the server, there is a large capacity non-volatile storage device, such as a hard disk drive, for storing the operative program and data files used by the server. In addition, this storage device also stores files allocated to each client's operative programs and data.

Each client is connected through a network file system, NFS, to the Unix file system, UFS, in the server. The client need not have its own disk drive for storing program and data files. In effect, client program and data files in the server are available to the client as virtual disk drives as the program and data files of the client are needed for operation.

To install a new software package onto such a server/client system, a package installation utility has been used. In the Unix System V Release 4 operating system, this installation utility is pkgadd (package add).

The pkgadd utility (a utility is a program) receives software packages for installation usually from a compact disk read only memory (CDROM). The software package is delivered on CDROM and read by the CDROM drive into the server. The pkgadd utility installs the package and stores the installed package on the hard disk drive in the server.

Where the software is used by both the server and the clients, the installation of the package must be done once for the server files and once for each of the clients. The client installation is installed onto file systems on the server's hard disk(s) which are made available to clients via NFS. For example, if the software package was to be installed for the server and three clients, the installation of the software package must be performed four times—once for the server and once for each of the clients.

Since each installation is a time consuming process, what is needed is the capability to install a software package on the server system and all the client file systems in a single installation operation.

SUMMARY OF THE INVENTION

In accordance with this invention, the above problem has been solved by installing a software package to multiple target systems in a client/server distributed processing system through the computer implemented steps of installing the software package on program files of the server; establishing a target list of clients served by the server; and installing the software package on program files of each client on the target list. In one embodiment of the invention, the software package contains installation options for each client on the target list and the establishing step analyzes each client to determine what, if any, installation options are to be installed on the client and constructs a target list of clients and installation options for each client as determined by the analysis.

As a further feature of the invention the client installation step reads a client entry identifying a client and installation options for the client from the target list and installs the installation options identified in the client entry from the software package to program files of the client.

In another embodiment of the invention, the software package contains additional software packages for each client on the target list and the establishing step analyzes each client to determine if one or more client-specific packages are to be installed on the client and what those to-be-installed, client-specific packages are. The establishing step then constructs a target list of clients and client-specific packages for each client.

The client installing step in this embodiment reads from the target list a client entry, identifying a client and client-specific packages for the client, and installs in the program files of the client the client-specific packages identified in the client entry. Further, the client installing step uses package-specific installation procedures provided with the client-specific package.

The above computer implemented steps in another implementation of the invention are provided as an article of manufacture, i.e. a computer storage medium containing a computer program of instructions for performing the above described steps.

In a machine implementation of the invention, apparatus for installing a multiple target software package in a distributed processing system has client and server computers. The server computer has a processor, a keyboard, and a plurality of data storage devices, said processor having a central processing unit, memory and input/output control, said input/output control connected to the keyboard and data storage devices. The multiple target software installing apparatus has a multiple target software package targeted for installation on a server file system in the server computer and on at least one client file system in the server computer. A server install module installs the software package onto the server file system. An analysis module compares a list of packages installed in each client file system to the multiple target software package and indicates whether the multiple target software package is to be installed on the client. A target build module builds a target list of client entries based upon the comparisons performed by the analysis module. These client entries identify clients where the target software package is to be installed. A client install module installs the software package onto each client file system for all client entries in the target list whereby the software package is installed on multiple client file systems at the server.

In another feature of the invention the software package contains a plurality of optional program files and the analysis module compares current program files in each client file system to the optional program files in the software package. Based on the results of the comparison of current program files to optional program files, the target build module builds a target list of client entries. The client entries identify clients where at least one optional program file from the software package is to be installed and identify the optional program files to be installed onto the client. The client install module reads each client entry on the target list and indicates the client and optional program files to be installed on the client. A package add module then adds to the program files of the client indicated by the client entry the optional files indicated by the client entry whereby the program files for the client are updated.

In another embodiment of the invention the software package has multiple, included, software packages and multiple, install procedures. Each install procedure identifies the included software package to be installed with the install procedure. The analysis module compares parameter information from each client file system with parameter information from the included software packages and indicates the included software package to be installed on the client file system. The target build module responsive to said analysis module builds a target list of client entries, and each client entry identifies the client and the included software package to be installed on the client. The client install module has a match module and a load module. The match module matches install procedures with the included software package identified in the client entry. The load module runs the install procedure matched to the included software to load the included software package identified in the client entry on the client file system, whereby each client has installed on the client's file system the included software package targeted to the client.

The great advantage and utility of the present invention is that the invention has reduced the installation of multiple target software package installations to a single installation operation for the user. The invention manages the installation to any number of target computing systems in the distributed processing system without intervention by the user.

The foregoing and other features, utilities and advantages of the invention will be apparent from the following more particular description of a preferred embodiment of the invention as illustrated in the accompany drawings.

BRIEF DESCRIPTION OF DRAWINGS

FIG. 3 illustrates another preferred embodiment of the invention showing the logical operations where a multiple target installation includes installing different options of Package A on different clients.

FIG. 4 shows the target list of clients and their options as used in FIG. 3.

FIG. 5 illustrates a class archive package having multiple directories.

FIG. 6 illustrates a target list for three clients attached to a server and the packages each client requires to be installed pursuant to the class archive package shown in FIG. 5.

FIG. 7 illustrates another preferred embodiment of the invention showing the logical operations where the class archive package shown in FIG. 5 is utilized to target a single installation package to multiple clients having different system architectures.

DETAILED DESCRIPTION OF PREFERRED EMBODIMENTS

The embodiments of the inventions described herein are implemented as logical operations in a distributed processing system having client and server computing systems. The logical operations are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

Figure 1:
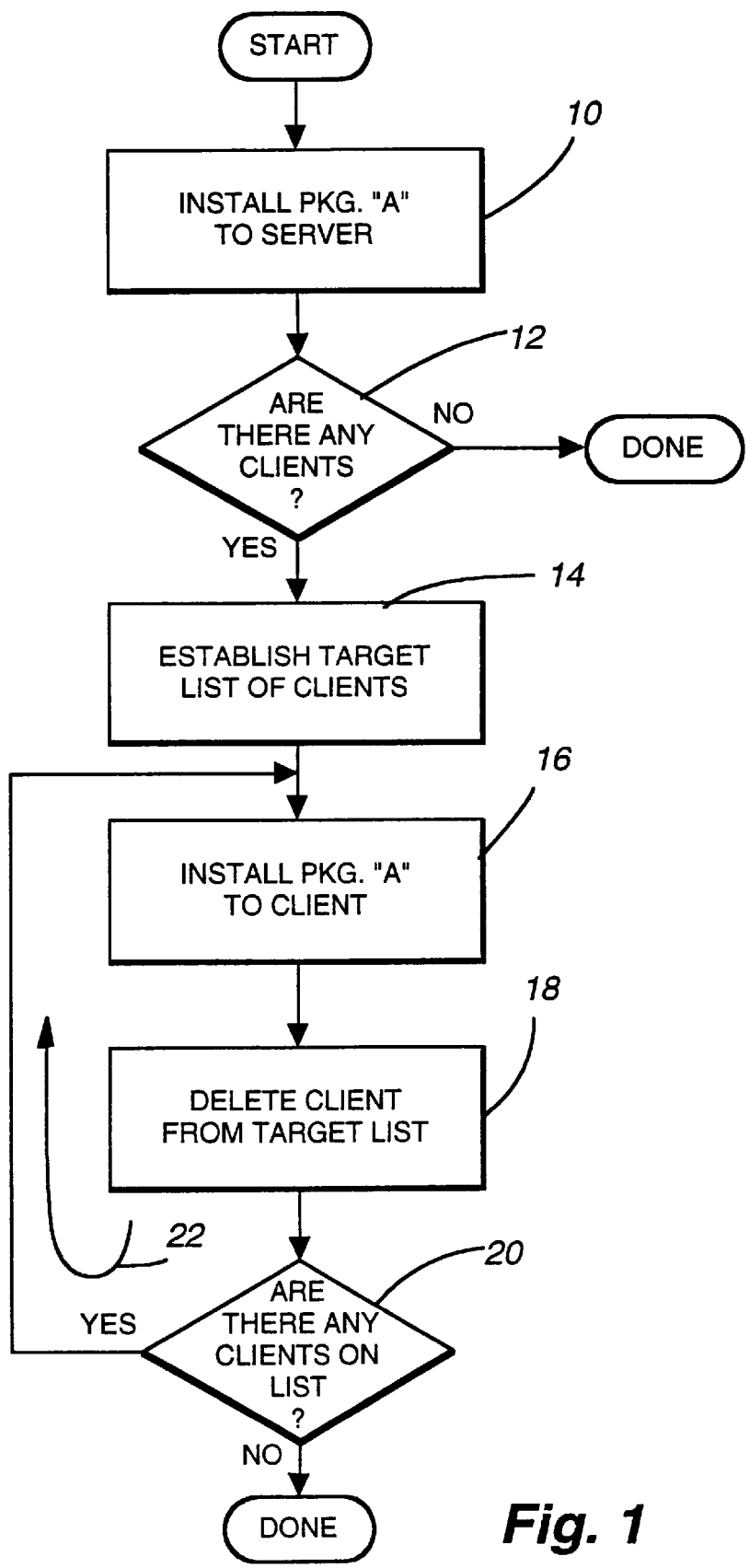
FIG. 1 illustrates a preferred embodiment of the invention showing the logical operations for installing a multiple target package.

In one preferred embodiment of the invention as shown in FIG. 1, the installation of a multiple target software package begins at operation 10. Installation operation 10 uses package add (pkgadd) utility provided in UNIX System V to install Package A to the server. Operation 10 uses the pkgadd utility to install Package A server files onto the hard disk drive of the server. After Package A is installed on the server, decision operation 12 tests whether there are clients attached to the server. If there are no client stations attached to the server, the installation is complete, and the operation branches "No" to exit the installation operation.

If there are client stations attached to the server, the process branches "Yes" to operation 14 to establish a list of clients on which package A is to be installed. This list might be included in Package A or be provided along with Package A. However, more likely the server will identify all clients attached to the server and provide the list of clients on which Package A is to be installed.

The install operation 16 then begins by reading the first client on the list and using Pkgadd to install Package A to the client's program files already stored in the hard drive of the server. After operation 16 has completed installation of Package A in the client's program files, operation 18 deletes that client from the target list (FIG. 1) of clients where the package is to be installed.

Decision operation 20 then detects whether there are any remaining clients on the target list. If there are additional target clients, the operation branches "Yes" back to operation 16. At operation 16 the next client on the list is identified, and Pkgadd installs Package A to that client. The operations 16, 18, and 20 in loop 22 continue until there are no clients on the target list. At this point, the installation is complete as Package A has been loaded onto the file system of the server and the file systems of each of the clients on the target list.

In the above-described embodiment of the invention in FIG. 1, the same package is installed to the server and all clients on the target list. An example of such a multiple target installation is the installation of a device driver on both the server and some or all of the clients attached to the server.

Figure 2:
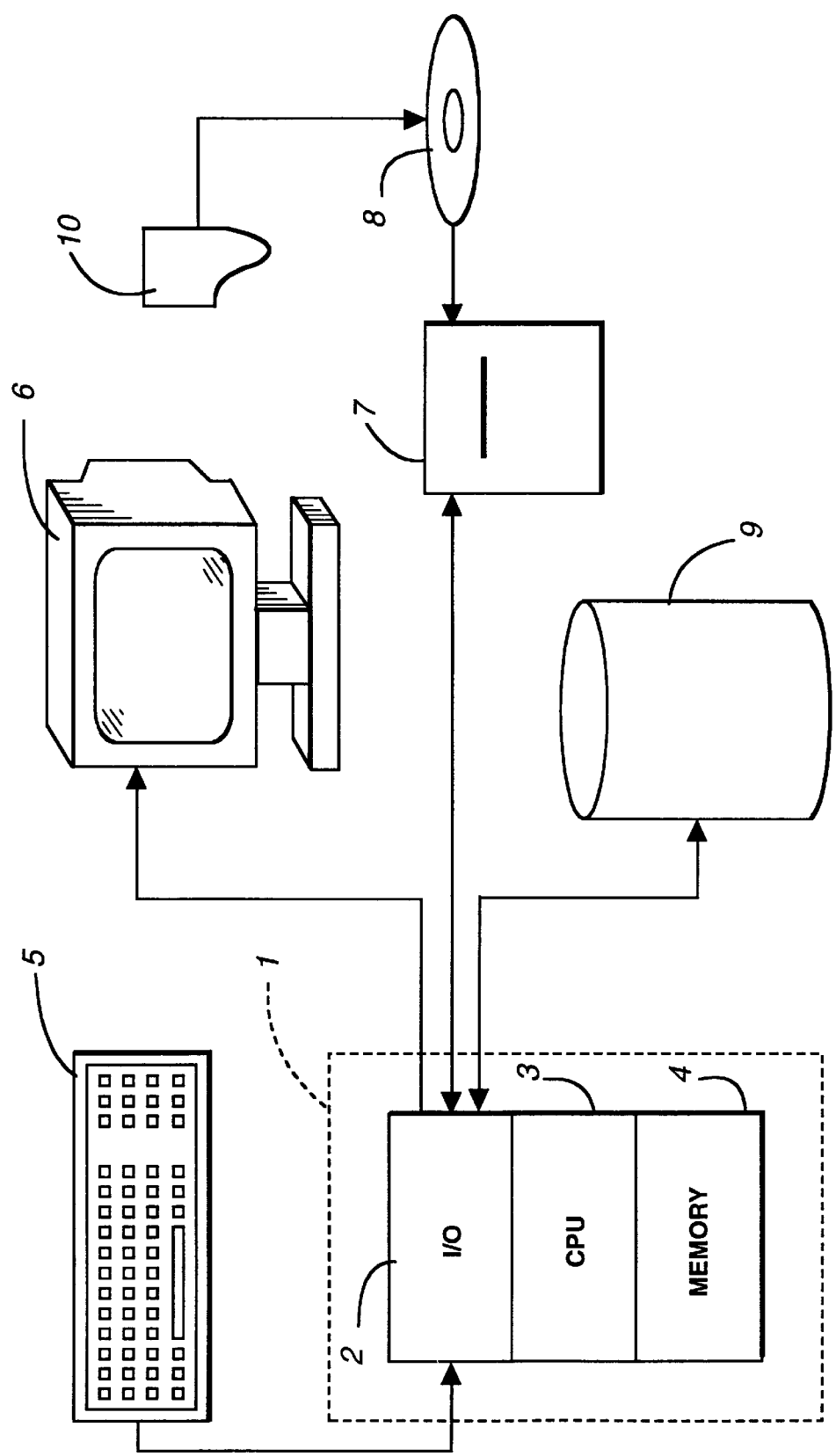
FIG. 2 illustrates a computing system to perform the computer implemented steps in accordance with the invention.

In FIG. 2, the environment of the distributed processing system is shown. The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 2, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC™ systems offered by Sun MicroSystems, Inc., personal computers offered by IBM Corporation and by other manufacturers of IBM-compatible personal computers, and systems running the UNIX™ operating system.

In another preferred embodiment of the invention as illustrated in FIG. 3, the multiple target installation includes the capability to install options of Package A on different clients. An example of such an installation would be a package containing software for a windowing system wherein the server requires all of the software in the package and the client requires some subset of this software.

In the embodiment of FIG. 3 the installation of the Multiple Target Package A begins as described before for FIG. 1A with the Pkgadd utility installing Package A to the server. After it is determined that there are clients on which Package A is to be installed (operation 12 in FIG. 1A), operation 24 in FIG. 3 analyzes each client to determine (1) if the client requires installation of any part of package A and (2) which options in package A are required by the client. This is accomplished by first reading parameter information about program files previously installed in the client and identified as included in Package A. Analyze module 24 then compares this parameter information of previously installed program files to parameter information identifying options available to those program files in the present version in Package A.

After analysis operation 24 is complete for each client, construct operation 26 builds a target list of clients for the installation of Package A. For each target client, the construct module 26 builds a target list of required options to be installed from Package A to the program files of that client. This target list, as shown in FIG. 4, is constructed from the information obtained in analysis operation 24, or in an alternative embodiment the target list could be provided along with Package A version being installed.

After the target list in FIG. 4 is constructed, option install module 28 in FIG. 3 reads the first client on the target list and uses pkgadd to install the selected options of Package A to that client. Once the pkgadd utility completes installation to this client, the operation proceeds as described in FIG. 1A to delete the client from the target list and check for additional clients on the target list. In effect, operations or modules 24 and 26 in FIG. 3 have replaced operation 14 in FIG. 1, and operation or module 28 has replaced operation 16 in FIG. 1.

The embodiment of the invention in FIG. 3 is particularly useful where the server and all of the clients use the same architecture but require different installation options. An example of such an installation would be a network printing package.

Another embodiment of the invention in FIG. 7 uses Package A packaged as a class archive package. The class archive package for Package A is illustrated in FIG. 5. As a class archive package, Package A permits installation of separate packages all contained within Package A to multiple target clients. In this type of multiple target installation, the server and the clients may be different computer system architectures. For example, it is assumed that the server is a Sun Microsystem™ computer using the SPARC™ architecture, client one is a Sun™ work station also using the SPARC™ architecture, client two is a work station using the X-86 architecture, and client three is a work station using a RISC architecture, such as, the Power PC™ architecture.

As illustrated in FIG. 5, the class archive Package A has multiple directories—install/, archive/, reloc/, pkginfo/ and pkgmap/. The pkginfo file is like a mailing label identifying targets (server and clients) and parameters for those targets. The pkgmap file is like a packing list identifying the contents of the class archive Package A. In the install directory there are loaded a number of scripts. Pkgadd utility uses these scripts to install various packages contained within Package A. These packages, in the example of FIG. 5, are Packages B, C, D and E and are stored in the archive directory. The reloc directory contains files that are to be loaded onto the server.

In the example of FIG. 5, it is assumed that Package B is a SPARC™ architecture package. Package C is an X-86 architecture package. Package D is a Power PC™ architecture package, and Package E is an X-86 architecture package. The installation scripts for each of these packages are in the install directory and are denoted by script filenames for each package as "i.pkg B," "i.pkg C," "i.pkg D" and "i.pkg E." The package named in the script filename identifies the package that the script will install when operated on by the pkgadd utility. A more complete description of the class archive package and how it is installed is described in cross-referenced application (37178.8306), which is incorporated herein by reference.

With reference to the contents of the class archive Package A in FIG. 5, FIG. 6 illustrates a target list for three clients attached to a server and the packages each client requires to be installed. Since client one is a SPARC™ station, it requires the installation of Package B. Client two being a X-86 architecture station requires the installation of Packages C and E. Finally, client three is a Power PC™ station and requires the installation of Package D.

FIG. 7 in combination with FIG. 1 illustrates another preferred embodiment of the invention utilizing the class archive package to target a single installation package to multiple clients having different system architectures. As before with FIG. 1A, package A is installed to the server by operation 10 in FIG. 1A. The pkgadd installation in operation 10 utilizes the server files in the reloc directory of the class archive package A to install the necessary files from package A into the server computer. In our example, these would be SPARC™ architecture files. After these files are installed on the server, decision operation 12 in FIG. 1A checks for clients. Since there are three clients in our example, decision operation 12 branches "Yes" to build-target-list module 30 in FIG. 7. Module 30 in FIG. 7 has replaced operation module 14 in FIG. 1A in this embodiment.

In the operation of the build-target-list module 30, the target list shown in FIG. 6 is constructed. The target list could be built from a list of clients and architecture parameters stored in the server, or constructed by comparing parameters describing the contents of the class archive package A in the pkgmap with parameters in server describing the architecture of the clients attached to the server. In either operation, the result is the production of the target list shown in FIG. 6.

After the target list is built by module 30, the class-archive-install module 32 installs the appropriate package to the first client on the target list. Module 32 begins by reading from the target list that client one requires Package B. The pkgadd utility then executes the "i.pkg B" script and installs Package B on the client one program files in the server. After the successful installation of Package B, the installation process proceeds to delete operation 18 in FIG. 1A. Class-archive-install module 32 in FIG. 7 has, in effect, replaced the install module 16 in FIG. 1A. Accordingly, the installation sequence of operations proceeds around loop 22 in FIG.

1A so that the next entry on the target list of clients is retrieved by module 32 in FIG. 7.

The second entry on the target list in FIG. 6 is client two which is the X-86 architecture client station. Therefore, pkgadd utilizes the "i.pkg C" script and the "i.pkg E" script to install Packages C and E on client two. The process again loops back to module 32 to install Package D on client three using the "i.pkg D" script this time.

With all of the clients on the target list processed and their associated packages installed, decision operation 20 in FIG. 1A will detect an empty target list and the multiple target installation operation is complete.

While the invention has been particularly shown and described with reference to a preferred embodiment thereof, it will be understood by those skilled in the art that various other changes in the form and details may be made therein without departing from the spirit and scope of the invention.

What is claimed is:

1. A method for installing a software package to multiple target systems in a client/server distributed processing system having a server and multiple clients, the server having a server file system and client file system for each client of the multiple clients, said method comprising the steps of:

(A) installing the software package onto the file system of the server;

(B) establishing a target list of clients of the multiple clients served by the server;

(C) installing the software package onto the client file system of each client on the target list established during said step of establishing.

2. The method of claim 1 wherein the software package contains installation options for the file system of each client on the target list and said establishing step comprises the steps of:

(D) analyzing each client to determine if installation options are to be installed on the client's file system and to determine what installation options are to be installed on the client's file system; and (E) constructing a target list of clients and installation options for each client as determined by said analyzing step.

3. The method of claim 1 wherein said step (C) of installing the software package onto the client file system comprises the steps of:

(F) reading a client entry identifying a client and installation options for the client's file system from the target list and providing the client entry; and (G) installing the installation options identified in the client entry from the software package to the file system of the client.

4. The method of claim 1 wherein the software package contains additional software packages for the file system of each client on the target list and said establishing step comprises the steps of:

(H) analyzing each client to determine if at least one client-specific package is to be installed on the client and to determine what client-specific packages are to be installed on the client's file system; and (I) constructing a target list of clients and client-specific packages for each client as determined by said analyzing step.

5. The method of claim 4 wherein step (C) comprises the steps of:

(J) reading from the target list a client entry identifying a client and client-specific packages for the client; and (K) installing to the file system of the client, identified by the client entry read in step J, the client-specific packages identified in the client entry, said installing step (K) using package-specific installation procedures provided with the client-specific package.

6. Apparatus for installing a multiple target software package in a distributed processing system having client and server computers, the server computer having a processor, a keyboard, and a plurality of data storage devices, said processor having a central processing unit, memory and input/output control, said input/output control connected to the keyboard and data storage devices, said apparatus comprising:

a multiple target software package targeted for installation on a server file system in the server computer and on at least one client file system in the server computer, the server file system and the at least one client file system located at the data storage devices of the server computer;

a server install module installing the software package on the server file system in the server computer;

an analysis module comparing a list of packages installed in each client file system located at the data storage devices of the server computer to the multiple target software package and indicating whether the multiple target software package is to be installed on the client;

target build module building a target list of client entries in response to said analysis module, said client entries identifying clients where the target software package is to be installed;

a client install module installing the software package on each client file system located at the data storage devices of the server computer for all client entries in the target list whereby the software package is installed on multiple file systems at the server.

7. The apparatus of claim 6 and in addition:

said software package comprises a plurality of optional program files;

said analysis module comparing program files in each client file system located at the data storage devices of the server computer to the optional program files in the software package;

said target build module building a target list of client entries in response to said analysis module, said client entries identifying clients where at least one optional program file from the software package is to be installed and identifying the optional program files to be installed at the client.

8. The apparatus of claim 7 wherein said client install module comprises:

a reader reading each client entry on the target list and indicating the client and optional program files to be installed on the client;

a package add module adding to the client indicated by the reader the optional program files indicated by the reader whereby the program files on the client indicated by the reader are updated by the optional program files added by the package add module.

9. The apparatus of claim 6 and in addition:

said software package has multiple included software packages and multiple install procedures, each install procedure identifying the included software package to be installed with the install procedure;

said analysis module comparing parameter information from each client file system with parameter information from the included software packages and indicating the included software package to be installed on the client file system;

said target build module responsive to said analysis module building a target list of client entries, each client entry identifying the client and the included software package to be installed on the client.

10. The apparatus of claim 9 wherein said client install module comprises:

match module matching install procedures with the included software package identified in the client entry;

load module running the install procedure to load the included software package identified in the client entry on the client file system also identified in the client entry, where each client has installed on the client's file system the included software package targeted to the client.

11. A computer program storage medium readable by a computing system and encoding a computer program of instructions for executing a computer process for installing a software package to multiple target systems in a client/server distributed processing system having a server and multiple clients, the server having a server file system and client file system for each client of the multiple clients, said computer process comprising the steps of:

(A) installing the software package onto the file system of the server;

(B) establishing a target list of clients of the multiple clients served by the server;

(C) installing the software package onto the client file system of each client on the target list established during said step of establishing.

12. The computer program storage medium of claim 11 wherein the software package contains installation options for the file system of each client on the target list, and where, in the computer program, the computer process step of establishing comprises the steps of:

(D) analyzing each client to determine if installation options are to be installed on the client's file system and to determine what installation options are to be installed on the client's file system; and (E) constructing a target list of clients and installation options for each client as determined by said analyzing step.

13. The computer program storage medium of claim 12 where, in the computer program, computer process step (C) comprises the steps of:

(F) reading a client entry identifying a client and installation options for the client's file system from the target list and providing the client entry; and (G) installing the installation options identified in the client entry from the software package to the file system of the client.

14. The computer program storage medium of claim 11 wherein the software package contains additional software packages for the file system of each client on the target list and where, in the computer program, the computer process step of establishing comprises the steps of:

(H) analyzing each client to determine if at least one client-specific package is to be installed on the client's file system and to determine what client-specific packages are to be installed on the client's file system; and (I) constructing a target list of clients and client-specific packages for each client as determined by said analyzing step.

15. The computer program storage medium of claim 14 where, in the computer program, computer process step (C) comprises the steps of:

(J) reading from the target list a client entry identifying a client and client-specific packages for the client; and (K) installing to the file system of the client, identified by the client entry read in step J, the client-specific packages identified in the client entry, said installing step (K) using package-specific installation procedures provided with the client-specific package.

* * * * *